(12) United States Patent
Hsu et al.

(10) Patent No.: US 10,823,899 B2
(45) Date of Patent: Nov. 3, 2020

(54) LIQUID CRYSTAL LIGHT-ADJUSTING FILM, BACKLIGHT MODULE AND MANUFACTURING METHOD OF LIQUID CRYSTAL LIGHT-ADJUSTING FILM

(71) Applicant: Coretronic Corporation, Hsin-Chu (TW)

(72) Inventors: Hsiung-Chun Hsu, Hsin-Chu (TW); Chih-Jen Tsang, Hsin-Chu (TW); Ping-Yeng Chen, Hsin-Chu (TW); Chong-Yang Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/361,241

(22) Filed: Mar. 22, 2019

(65) Prior Publication Data
US 2019/0302345 A1 Oct. 3, 2019

(30) Foreign Application Priority Data

Mar. 27, 2018 (CN) .......................... 2018 1 0258258

(51) Int. Cl.
*G02B 1/111* (2015.01)
*F21V 8/00* (2006.01)
*G02F 1/13363* (2006.01)
*G02F 1/1334* (2006.01)

(52) U.S. Cl.
CPC ............. *G02B 6/0051* (2013.01); *G02B 1/111* (2013.01); *C09K 2323/03* (2020.08); *C09K 2323/06* (2020.08); *G02B 6/0055* (2013.01); *G02B 6/0061* (2013.01); *G02B 6/0066* (2013.01); *G02F 2001/13347* (2013.01); *G02F 2001/133638* (2013.01)

(58) Field of Classification Search
CPC .. G02B 6/0051; G02B 6/0055; G02B 6/0061; G02B 6/0066; G02B 1/111; G02F 1/1334; G02F 2001/133638; G02F 2001/13347; Y10T 428/1036; Y10T 428/1059; Y10T 428/1086; C09K 2019/546; C09K 2019/548
USPC ...... 428/1.3, 1.5, 1.6; 349/89, 183, 191, 201
See application file for complete search history.

(56) References Cited

U.S. PATENT DOCUMENTS

| | | | | |
|---|---|---|---|---|
| 4,435,047 A | * | 3/1984 | Fergason | ............. C09K 19/544 264/4 |
| 2010/0271571 A1 | * | 10/2010 | Zhang | .................... C09K 19/44 349/86 |

FOREIGN PATENT DOCUMENTS

| | | |
|---|---|---|
| TW | I412578 B | 10/2013 |
| TW | I605287 B | 11/2017 |

* cited by examiner

*Primary Examiner* — Ruiyun Zhang

(57) ABSTRACT

A liquid crystal light-adjusting film includes a polymer material substrate and a plurality of elliptical crystal cells. The polymer material substrate has a light incident surface and a light exiting surface opposite to each other. A direction from the light incident surface to the light exiting surface is a thickness direction of the polymer material substrate. The elliptical crystal cells are disposed in the polymer material substrate. A long axis direction of each of the elliptical crystal cells is arranged along a first direction perpendicular to the thickness direction, and each of the elliptical crystal cells comprises a plurality of liquid crystal molecules. A manufacturing method of the liquid crystal light-adjusting film and a backlight module using the liquid crystal light-adjusting film are also provided.

6 Claims, 7 Drawing Sheets

| Amount of stretching (OV) | EX1 | EX1.7 | EX1.8 | EX1.9 |
|---|---|---|---|---|
| 85:15(sur X1)(1t) |  |  |  |  |

LIQUID CRYSTAL LIGHT-ADJUSTING FILM, BACKLIGHT MODULE AND MANUFACTURING METHOD OF LIQUID CRYSTAL LIGHT-ADJUSTING FILM

CROSS-REFERENCE TO RELATED APPLICATION

This application claims the priority benefit of china application (CN201810258258.X filed on 2018 Mar. 27). The entirety of the above-mentioned patent application is hereby incorporated by reference herein and made a part of this specification.

FIELD OF THE INVENTION

The invention relates to a light-adjusting film, and more particularly to a liquid crystal light-adjusting film, a manufacturing method for the same, and a backlight module using the liquid crystal light-adjusting film.

BACKGROUND OF THE INVENTION

As the demand for electronic parts of vehicles has increased year by year, various display systems for vehicles have been developed successively. There have also been considerable developments in the field of automotive displays. However, due to the stricter regulations for vehicle equipment, how to meet the application requirements of the driver and comply with the standards at the same time will be the focus of future development in this field.

Diffusion plates for automotive display are known to have a large thickness, which cannot meet the requirements for thin and lightweight models. Polymer dispersed liquid crystals (PDLC) film has an excellent effect of switching between transparent and matte surfaces, but it cannot achieve the scattering function in specific directions.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a liquid crystal light-adjusting film, which can be applied to the functional design requirements of anti-reflection or anti-peeping.

The invention provides a manufacturing method of a liquid crystal light-adjusting film. The manufactured liquid crystal light-adjusting film can be applied to anti-reflection or anti-peeping functional design requirements.

The invention provides a backlight module, which can be applied to the functional design requirements of anti-reflection or anti-peeping.

Other objectives and advantages of the invention can be further understood from the technical features disclosed by the invention.

In order to achieve one or some or all of the above objectives or other objectives, the liquid crystal light-adjusting film provided by an embodiment of the invention includes a polymer material substrate and a plurality of elliptical crystal cells. The polymer material substrate has a light incident surface and a light exiting surface opposite to each other. A direction from the light incident surface to the light exiting surface is a thickness direction of the polymer material substrate. The elliptical crystal cells are disposed in the polymer material substrate. A long axis direction of each of the elliptical crystal cells is arranged along a first direction perpendicular to the thickness direction, and each of the elliptical crystal cells comprises a plurality of liquid crystal molecules.

In order to achieve one or some or all of the above objectives or other objectives, a manufacturing method of the liquid crystal light-adjusting film provided by an embodiment of the invention includes steps of: mixing a plurality of liquid crystal molecules into a polymer material and adding an interface active agent to form a polymer material substrate and a plurality of crystal cells in the polymer material substrate; and stretching the polymer material substrate along a first direction perpendicular to a thickness direction of the polymer material substrate so that the crystal cells are extended along the first direction to form a plurality of elliptical crystal cells.

In order to achieve one or some or all of the above objectives or other objectives, a backlight module provided by an embodiment of the invention includes an optical plate, a light source and the above-mentioned liquid crystal light-adjusting film. The optical plate is disposed beside the light incident surface of the liquid crystal light-adjusting film and is adapted to convert light into a surface light source. The light source is disposed beside the optical plate and is adapted to emit a light into the optical plate.

In summary, according to the liquid crystal light-adjusting film and the manufacturing method thereof in the embodiments of the invention, the long axis direction of the elliptical crystal cell is arranged along the first direction when the polymer material substrate is stretched in the first direction. When light enters the elliptical crystal cell, the refraction angle is different due to the different surface curvatures of the elliptical crystal cell, so that the light has different amount of scattering in different directions, thereby resulting in anisotropic scattering characteristic. This characteristic can be applied to anti-reflection or anti-peeping functional design requirements. Because the backlight module of the embodiments of the invention employs the liquid crystal light-adjusting film, the functional design requirements of anti-reflection or anti-peeping can be achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
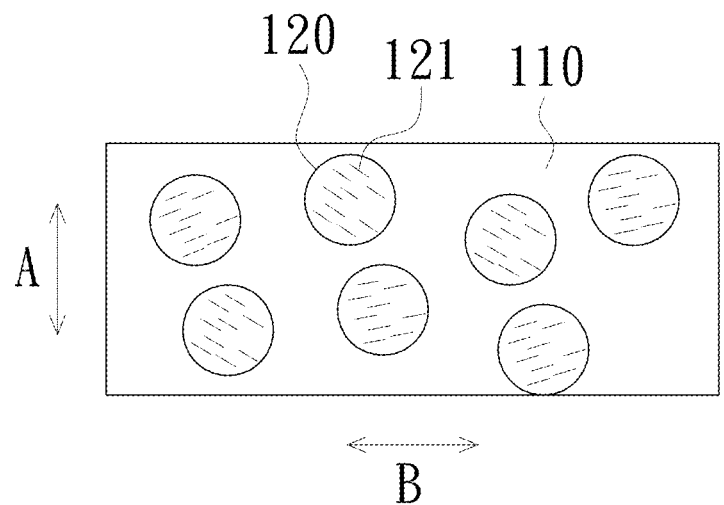
FIGS. 1A and 1B are schematic flowcharts of a manufacturing method of a liquid crystal light-adjusting film according to an embodiment of the invention.
Figure 1B:
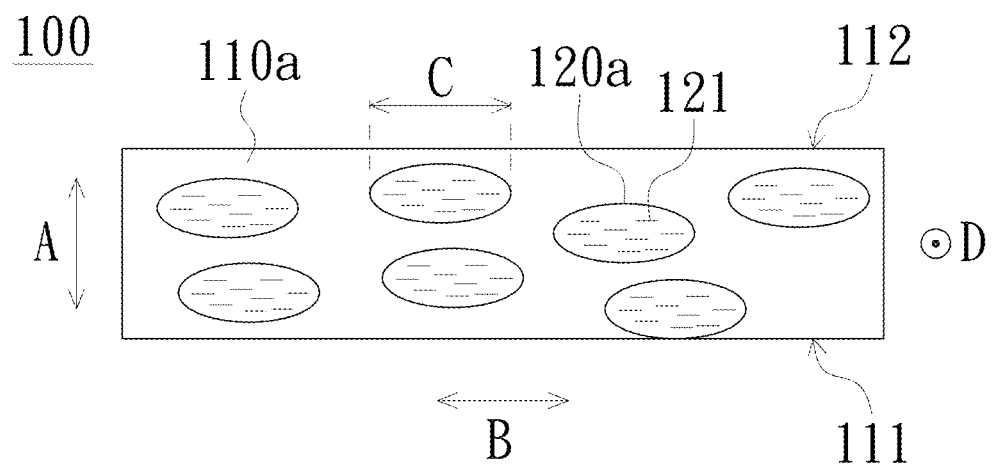

FIGS. 1A and 1B are schematic flowcharts of a manufacturing method of a liquid crystal light-adjusting film according to an embodiment of the invention. The manufacturing method of the liquid crystal light-adjusting film in the embodiment includes following steps of: as shown in FIG. 1A, mixing a plurality of liquid crystal molecules 121 into a polymer material and adding an interface active agent; and forming a polymer material substrate 110 and a plurality of crystal cells 120 in the polymer material substrate 110 after the polymer material is cured. In the embodiment, the used liquid crystal molecules are, for example, E7 liquid crystal; the used polymer material includes, for example, polyvinyl alcohol (PVA); and the formed polymer material substrate 110 is polyvinyl alcohol substrate. The types of liquid crystal molecules, polymer material, and interface active agent of the invention are not limited to those listed herein.

Then, the polymer material substrate 110 is stretched along a first direction B in perpendicular to a thickness direction A of the polymer material substrate 110. FIG. 1B is a schematic view after stretching, and the stretched polymer material substrate is indicated by reference numeral 110a in FIG. 1B. During the process of stretching, the crystal cells 120 in FIG. 1A are extended along the first direction B to form a plurality of elliptical crystal cells 120a.

In this way, the manufactured liquid crystal light-adjusting film 100 includes the polymer material substrate 110a and the elliptical crystal cells 120a. The polymer material substrate 110a has opposite light incident surface 111 and light exiting surface 112. The direction from the light incident surface 111 to the light exiting surface 112 is the thickness direction A of the polymer material substrate 110a, and the polymer material substrate 110a is stretched along the first direction B perpendicular to the thickness direction A. The elliptical crystal cells 120a are disposed in the polymer material substrate 110a. Since the crystal cells 120 in FIG. 1A are also stretched during the stretching of the polymer material substrate 110a along the first direction B perpendicular to the thickness direction A, a long axis direction C of each of the elliptical crystal cells 120a in the liquid crystal light-adjusting film 100 in the embodiment is arranged along the first direction B, and each of the elliptical crystal cells 120a includes a plurality of liquid crystal molecules 121.

In addition, the refractive index of the polymer material substrate 110 changes after stretching. Specifically, the stretched polymer material substrate 110a has a first refractive index N1 in the first direction B, the polymer material substrate 110 has a second refractive index N2 in a second direction D perpendicular to the first direction B and the thickness direction A at the same time, and N1>N2. Furthermore, the first refractive index N1 and the second refractive index N2 are, for example, less than the refractive index N3 of the elliptical crystal cell 120a, but not limited thereto.

The liquid crystal light-adjusting film 100 of the embodiment includes the elliptical crystal cells 120a, and the long axis direction C of the elliptical crystal cells 120a is arranged along the first direction B. When light enters the polymer material substrate 110a from the light incident surface 111 and is transmitted to the elliptical crystal cells 120a, the refraction angle is different due to the different surface curvatures of the elliptical crystal cells 120a, so that the light has different amounts of scattering in different directions, and thereby producing anisotropic scattering characteristic. This anisotropic scattering characteristic can be applied to anti-reflection or anti-peeping functional design requirements. Hereinafter, the principle of the elliptical crystal cell 120a changing the light refraction angle will be described in detail.

Figure 2A:
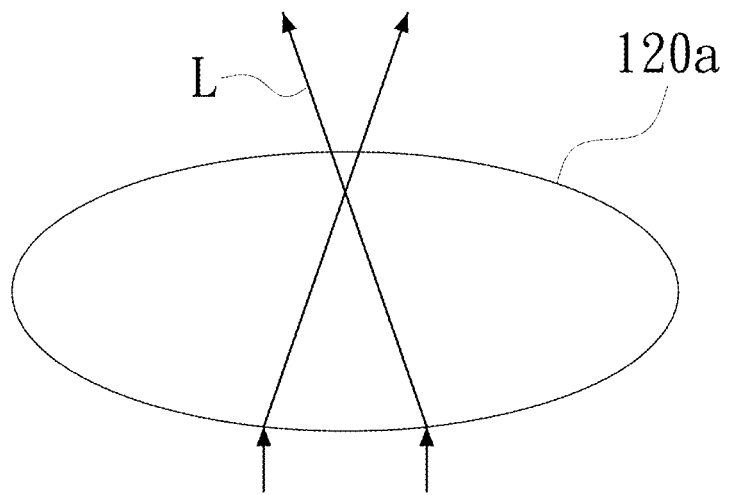
FIG. 2A is a schematic front view of an elliptical crystal cell according to an embodiment of the invention.
Figure 2B:
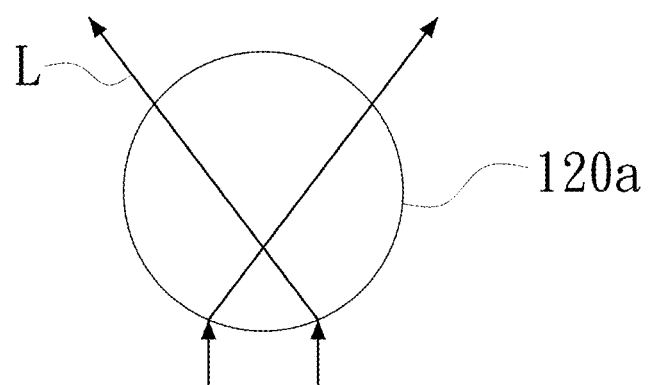
FIG. 2B is a schematic side view of an elliptical crystal cell according to an embodiment of the invention.

FIG. 2A is a schematic sectional view of the refracted light of the elliptical crystal cell in FIG. 1B parallel to the long axis direction, and FIG. 2B is a schematic sectional view of the refracted light of the elliptical crystal cell in FIG. 1B perpendicular to the long axis direction. Please refer to FIGS. 2A and 2B. The radius of curvature of the elliptical crystal cell 120a in FIG. 2A is relatively large and the radius of curvature thereof in FIG. 2B is relatively small, therefore, when light L passes through the elliptical crystal cell 120a, the refraction angle of the light L in the section of FIG. 2A is relatively small and the refraction angle of the light L in the section of FIG. 2B is relatively large, as such, the above-mentioned characteristic of anisotropic scattering can be produced. In summary, when the curvatures of the elliptical crystal cells 120a are different and thereby causing the incident angle of the light is changed or the refractive index between the polymer material substrate 110a and the elliptical crystal cell 120a is different, both of them will cause the liquid crystal light-adjusting film 100 to produce anisotropic scattering characteristic, according to the Snell's Law.

Figure 3:
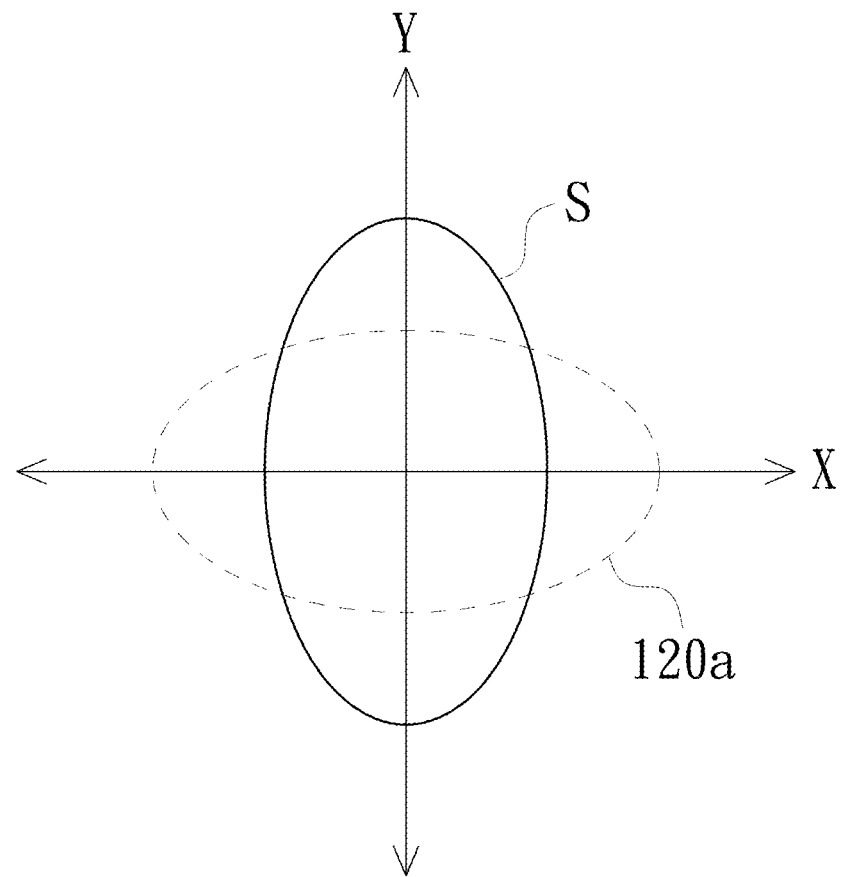
FIG. 3 is a schematic diagram of a light pattern on a light exiting surface side after the light has passed through the elliptical crystal cell according to an embodiment of the invention.

FIG. 3 is a schematic diagram of a light pattern on the light exiting surface side after the light has passed through the elliptical crystal cell according to an embodiment of the invention, wherein the X axis is parallel to the long axis direction of the elliptical crystal cell 120a. As shown in FIG. 3, due to the above-mentioned characteristic of anisotropic scattering, an elliptical light pattern S is formed after the light has passed through the elliptical crystal cell 120a.

Figure 4:
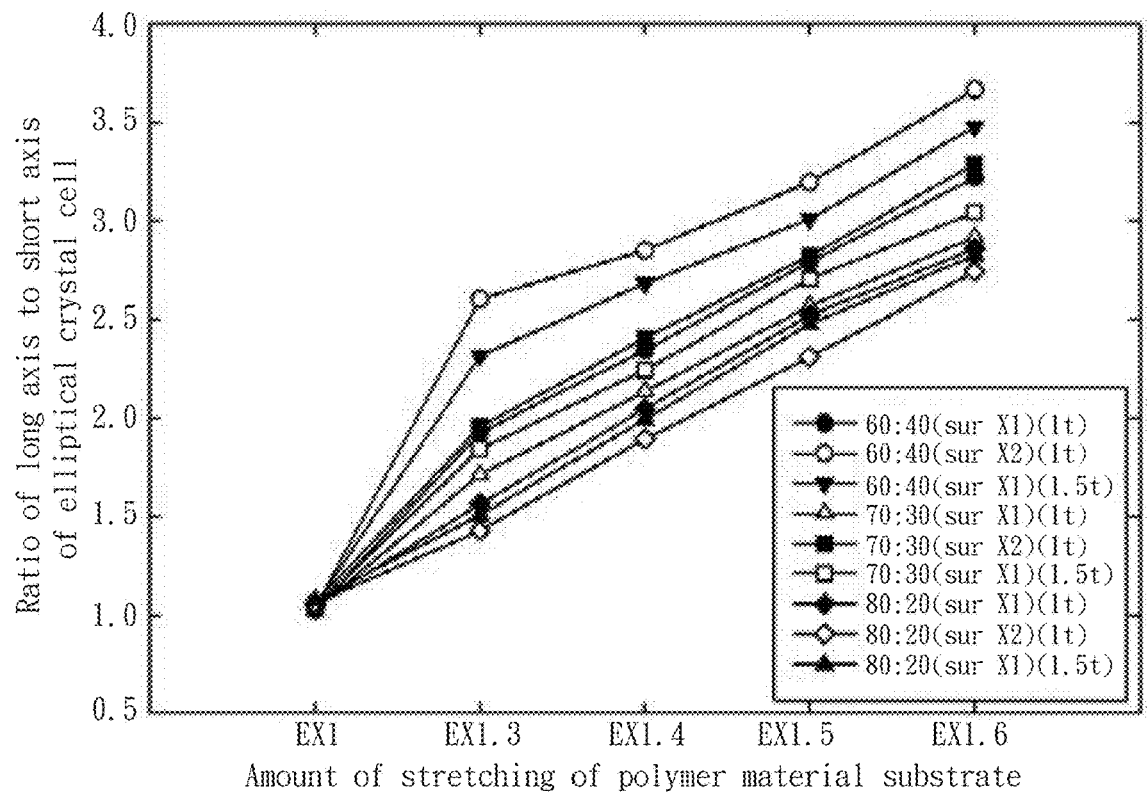
FIG. 4 is a schematic diagram showing the relationship between an amount of stretching of a polymer material substrate and an amount of deformation of elliptical crystal cells according to various embodiments of the invention.

FIG. 4 is a schematic diagram showing the relationship between an amount of stretching of the polymer material substrate and an amount of deformation of the elliptical crystal cell according to various embodiments of the invention. In FIG. 4, the horizontal axis represents an amount of stretching of the polymer material substrate, EX1 represents that the amount of stretching is 1 time, (7.5 cm), EX1.3 represents that the amount of stretching is 1.3 times (9.75 cm), and so forth. The vertical axis is the ratio of the long axis to the short axis of the elliptical crystal cell 120a. In addition, each line in FIG. 4 represents one implementation of the liquid crystal light-adjusting film 100. For example, 60:40 (sur X1) (1t) means that the ratio of the volume of the polymer material substrate 110a to the elliptical crystal cells 120a is 60:40, sur X1 means that 1× dose of the interface active agent is used, and 1t means that the thickness of the liquid crystal light-adjusting film 100 (i.e., the thickness of the polymer material substrate 110a) is 1 time. It can be known from FIG. 4 that the ratio of the long axis to the short axis of the elliptical crystal cell 120a is also higher when the amount of the stretching of the polymer material substrate 110a is higher.

Figure 5:
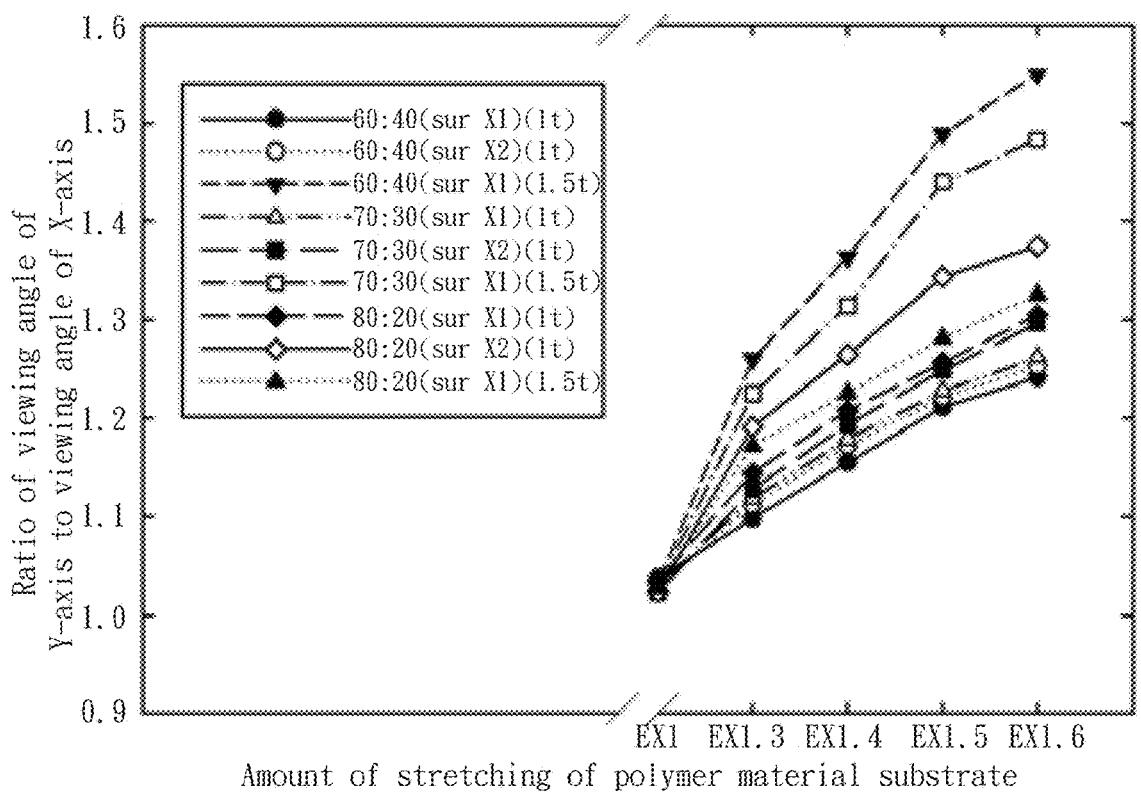
FIG. 5 is a schematic diagram showing the relationship between an amount of stretching of the polymer material substrate and the isotropic scattering effect after light has passed through the crystal cells according to various embodiments of the invention.
Figure 6:
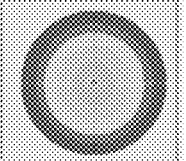
FIG. 6 is a schematic diagram of light pattern after light has passed through the crystal cells in a state where no voltage is applied to the liquid crystal light-adjusting film when the polymer material substrate is not stretched and after being stretched to different extents according to various embodiments of the invention.

FIG. 5 is a schematic diagram showing the relationship between an amount of stretching of the polymer material substrate and the isotropic scattering effect after light has passed through the crystal cells according to various embodiments of the invention. In FIG. 5, the horizontal axis represents an amount of stretching of the polymer material substrate, and the vertical axis is the ratio of a viewing angle of the Y axis to a viewing angle of the X axis as shown in FIG. 3 after the light has passed through the crystal cells, i.e., Y-axial viewing angle/X-axial viewing angle. It can be known from FIG. 5 that the difference in surface curvature between the long axis and the short axis of the elliptical crystal cell 120a is also higher when the amount of stretching of the polymer material substrate 110a is higher (the ratio of the long axis to the short axis of the elliptical crystal cells 120a is also higher as known from FIG. 4 mentioned above), and therefore the ratio of the viewing angle of the Y axis to the viewing angle of the X axis is also higher after the light has passed through the crystal cells. FIG. 6 is a schematic diagram of the light patterns after light has passed through the crystal cell in a state where no voltage is applied to the liquid crystal light-adjusting film when the polymer material substrate is not stretched and after being stretched to different degrees according to various embodiments of the invention. It can be seen from FIGS. 5 and 6 that the elliptical crystal cells formed after the polymer material substrate has been stretched can indeed achieve the anisotropic scattering characteristic.

Figure 7:
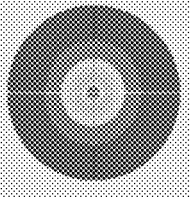
FIG. 7 is a schematic diagram of light pattern after light has passed through the crystal cell in a state where no voltage is applied to the liquid crystal light-adjusting film when the polymer material substrate is not stretched and after being stretched to different extents according to another embodiment of the invention.
Figure 7:
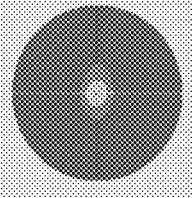
Figure 7:
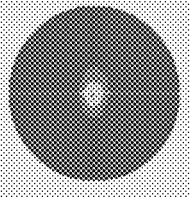
Figure 7:
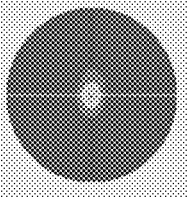

In an embodiment, in order to make the anisotropic scattering characteristic have an ideal effect, the volume ratio of the polymer material substrate 110a to the elliptical crystal cells 120a is, for example, 85:15, and the thickness of the liquid crystal light-adjusting film 100 is, for example, 90 micrometers (μm). By this volume ratio, a diagram of light pattern after light has passed through the crystal cells in a state where no voltage is applied to the liquid crystal light-adjusting film when the polymer material substrate is not stretched and after being stretched to different degrees can be referred to FIG. 7. However, the invention is not limited thereto, and a person skilled in the art can prepare suitable anisotropic scattering characteristic according to the above descriptions, which still falls within the scope of the invention.

Figure 8:
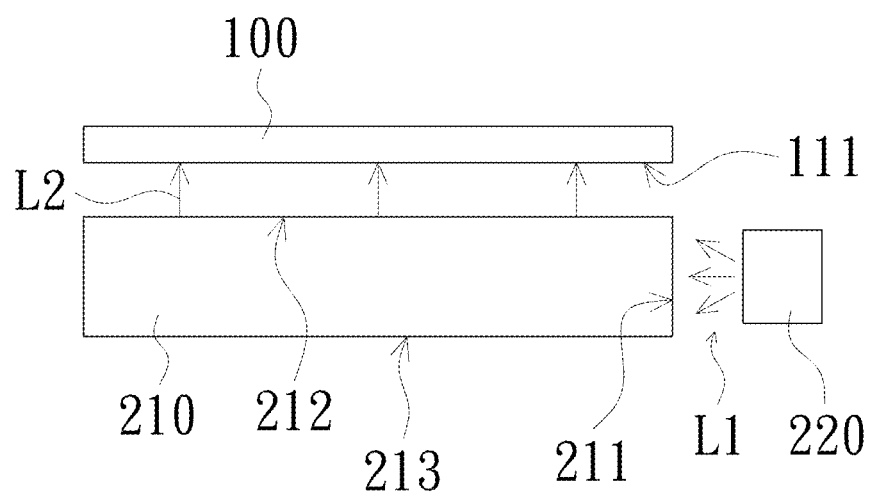
FIG. 8 is a schematic diagram of a backlight module according to an embodiment of the invention.

FIG. 8 is a schematic diagram of a backlight module according to an embodiment of the invention. Please refer to FIG. 8. The backlight module 200 of the embodiment includes an optical plate 210, a light source 220 and the above-mentioned liquid crystal light-adjusting film 100. The optical plate 210 and the light incident surface 111 of the liquid crystal light-adjusting film 100 are oppositely disposed, and the light source 220 is disposed beside the optical plate 210. The light source 220 is adapted to emit light L1 into the optical plate 210, and the light L1 is transmitted to the liquid crystal light-adjusting film 100 via the optical plate 210. In the embodiment, the optical plate 210 is, for example, a light guide plate and has adjacent light incident surface 211 and light exiting surface 212. The light exiting surface 212 is opposite to the light incident surface 111 of the liquid crystal light-adjusting film 100, and the light source 220 is opposite to the light incident surface 211 of the optical plate 210. The optical plate 210 allows the light L1 provided by the light source 220 to exit from the light exiting surface 212 to form a surface light source L2 and enter the liquid crystal light-adjusting film 100. Since the liquid crystal light-adjusting film 100 of the embodiment has the characteristic of anisotropic scattering, the backlight module 200 of the embodiment can be applied to anti-reflection or anti-peeping functional design requirements.

It is to be noted that the type of the above-mentioned optical plate 210 and its relative position to the light source 220 are only examples, and the invention is not limited thereto. In another embodiment, the optical plate 210 may be a light guide plate having one or more accommodating grooves (not shown) on a bottom surface 213, and the light source 220 is disposed in the accommodating groove. In still another embodiment, the optical plate 210 may be a diffusion plate and the light source 220 is disposed below the diffusion plate.

In summary, according to the liquid crystal light-adjusting film and the manufacturing method thereof in the embodiments of the invention, the long axis direction of the elliptical crystal cell is arranged along the first direction when the polymer material substrate is stretched in the first direction. When light enters the elliptical crystal cell, the refraction angle is different due to the different surface curvatures of the elliptical crystal cell, so that the light has different amount of scattering in different directions, thereby resulting in anisotropic scattering characteristic. This characteristic can be applied to anti-reflection or anti-peeping functional design requirements. Because the backlight module of the embodiments of the invention employs the liquid crystal light-adjusting film, the functional design requirements of anti-reflection or anti-peeping can be achieved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A liquid crystal light-adjusting film, comprising:
    a polymer material substrate, having a light incident surface and a light exiting surface opposite to each other, wherein a direction from the light incident surface to the light exiting surface is a thickness direction of the polymer material substrate; and
    a plurality of elliptical crystal cells, disposed in the polymer material substrate, wherein a long axis direction of each of the elliptical crystal cells is arranged along a first direction perpendicular to the thickness direction, and each of the elliptical crystal cells comprises a plurality of liquid crystal molecules;
    wherein the polymer material substrate has a first refractive index $N1$ in the first direction, the polymer material substrate has a second refractive index $N2$ in a second direction perpendicular to the first direction and the thickness direction at the same time, and $N1>N2$.

2. The liquid crystal light-adjusting film according to claim 1, wherein the polymer material substrate comprises a polyvinyl alcohol substrate.

3. The liquid crystal light-adjusting film according to claim 1, wherein a volume ratio of the polymer material substrate to the elliptical crystal cells is 85:15, and a thickness of the liquid crystal light-adjusting film is 90 μm.

4. A backlight module, comprising:
    a liquid crystal light-adjusting film, comprising a polymer material substrate and a plurality of elliptical crystal cells, wherein the polymer material substrate has a light incident surface and a light exiting surface opposite to each other, a direction from the light incident surface to the light exiting surface is a thickness direction of the polymer material substrate, the elliptical crystal cells are disposed in the polymer material substrate, a long axis direction of each of the elliptical crystal cells is arranged along a first direction perpendicular to the thickness direction, and each of the elliptical crystal cells comprises a plurality of liquid crystal molecules;
    an optical plate, disposed oppositely to the light incident surface of the liquid crystal light-adjusting film; and
    a light source, disposed beside the optical plate, wherein the light source is adapted to emit a light into the optical plate, and the light is transmitted to the liquid crystal light-adjusting film via the optical plate;
    wherein the polymer material substrate has a first refractive index $N1$ in the first direction, the polymer material substrate has a second refractive index $N2$ in a second direction perpendicular to the first direction and the thickness direction at the same time, and $N1>N2$.

5. The backlight module according to claim 4, wherein the polymer material substrate comprises a polyvinyl alcohol substrate.

6. The backlight module according to claim 4, wherein a volume ratio of the polymer material substrate to the elliptical crystal cells is 85:15, and a thickness of the liquid crystal light-adjusting film is 90 μm.

* * * * *